(12) United States Patent
Wauldron

(10) Patent No.: US 9,990,850 B2
(45) Date of Patent: Jun. 5, 2018

(54) SYSTEM, MEDIA, AND METHOD FOR PARKING MANAGEMENT

(71) Applicant: PARKXL, LLC, St. Augustine, FL (US)

(72) Inventor: James T. Wauldron, St. Augustine, FL (US)

(73) Assignee: PARKXL, LLC, St. Augustine, FL (US)

( * ) Notice: Subject to any disclaimer, the term of this patent is extended or adjusted under 35 U.S.C. 154(b) by 0 days. days.

(21) Appl. No.: 15/677,783

(22) Filed: Aug. 15, 2017

(65) Prior Publication Data

US 2018/0053418 A1    Feb. 22, 2018

Related U.S. Application Data

(60) Provisional application No. 62/376,145, filed on Aug. 17, 2016.

(51) Int. Cl.
    *G08G 1/14*    (2006.01)
(52) U.S. Cl.
    CPC ............ *G08G 1/148* (2013.01); *G08G 1/144* (2013.01)
(58) Field of Classification Search
    CPC ..... G08G 1/148; G08G 1/144; G06G 30/0645
    USPC ....... 340/932.2, 933, 938; 705/13, 1.1, 7.35, 705/400, 418
    See application file for complete search history.

(56) References Cited

U.S. PATENT DOCUMENTS

| | | | |
|---|---|---|---|
| 8,671,014 B2 * | 3/2014 | Stefik | G06Q 10/02 705/1.1 |
| 8,704,680 B1 | 4/2014 | Zhang | |
| 8,843,307 B1 | 9/2014 | Kolodziej | |
| 2002/0099574 A1 | 7/2002 | Cahill et al. | |
| 2004/0254840 A1 | 12/2004 | Slemmer et al. | |
| 2007/0040701 A1 | 2/2007 | Browne et al. | |
| 2007/0290888 A1 * | 12/2007 | Reif | G07B 15/02 340/932.2 |

(Continued)

FOREIGN PATENT DOCUMENTS

WO    2016/155586 A1    6/2016

OTHER PUBLICATIONS

JustPark: Find your perfect parking space, published Jul. 21, 2016, https://web.archive.org/web/20160721080249/http://justpark.com/.

(Continued)

*Primary Examiner* — Toan N Pham
(74) *Attorney, Agent, or Firm* — Dinsmore & Shohl LLP

(57) ABSTRACT

Systems, methods, and media for parking management are provided. A method includes receiving from a parker at a first device authentication input and then vehicle input that associates a vehicle with the parker, wherein the vehicle input comprises vehicle registration input or selection of a registered vehicle. The method may further include subsequently receiving, from the parker at the first device, spot criteria comprising location criteria and temporal criteria. The method may also include outputting to the first device, based upon receipt of the spot criteria, spot indicators representing spots based on the location criteria, the temporal data, and characteristics of the vehicle, wherein each spot comprises a stored status. The method may further include subsequently receiving a selection of a spot from the parker at the first device.

20 Claims, 9 Drawing Sheets

(56) References Cited

U.S. PATENT DOCUMENTS

| | | |
|---|---|---|
| 2011/0166897 A1* | 7/2011 | Beckman ............... G06Q 10/02 |
| | | 705/5 |
| 2012/0265434 A1 | 10/2012 | Woodard et al. |
| 2013/0073350 A1 | 3/2013 | Blustein |
| 2013/0159070 A1 | 6/2013 | Salamone |
| 2014/0278591 A1 | 9/2014 | Blecharczyk et al. |
| 2015/0051926 A1 | 2/2015 | Aaron et al. |
| 2015/0066545 A1 | 3/2015 | Kotecha et al. |
| 2015/0170518 A1 | 6/2015 | Rodriguez Garza |
| 2015/0187146 A1 | 7/2015 | Chen et al. |
| 2015/0237167 A1 | 8/2015 | Blanco et al. |
| 2016/0117866 A1 | 4/2016 | Stancato et al. |
| 2016/0140845 A1 | 5/2016 | Agrawal et al. |
| 2016/0140846 A1* | 5/2016 | Outwater ............... G08G 1/144 |
| | | 340/932.2 |
| 2016/0148237 A1 | 5/2016 | Ifrach et al. |
| 2016/0180712 A1 | 6/2016 | Rosen et al. |
| 2017/0140586 A1 | 5/2017 | Volz |

OTHER PUBLICATIONS

International Search Report and Written Opinion dated Oct. 31, 2017 in International Application No. PCT/US201/047043 (13 pages total).

* cited by examiner

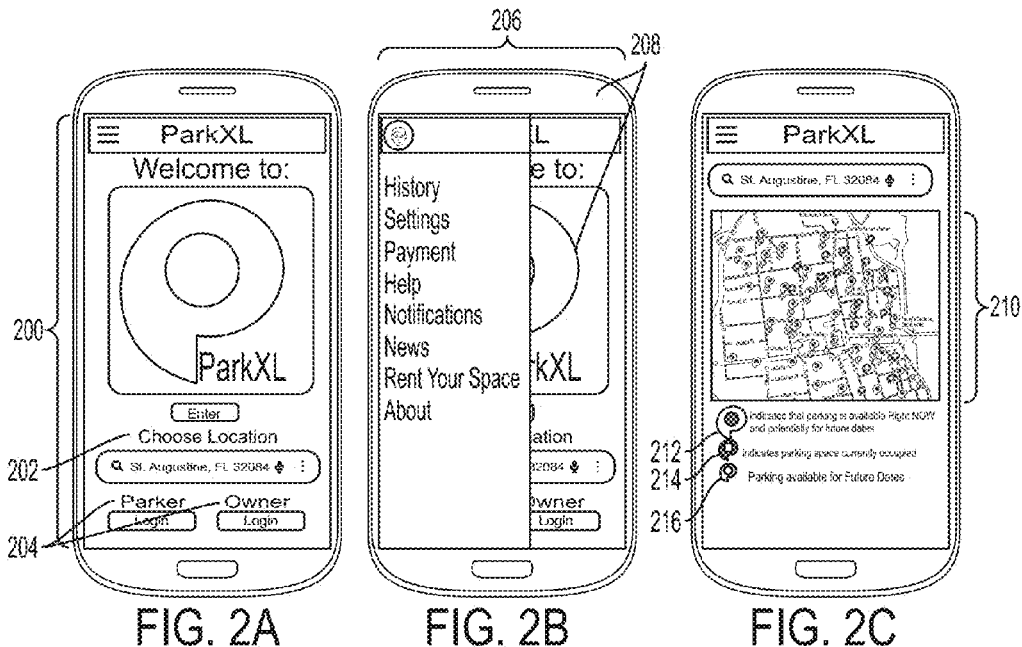
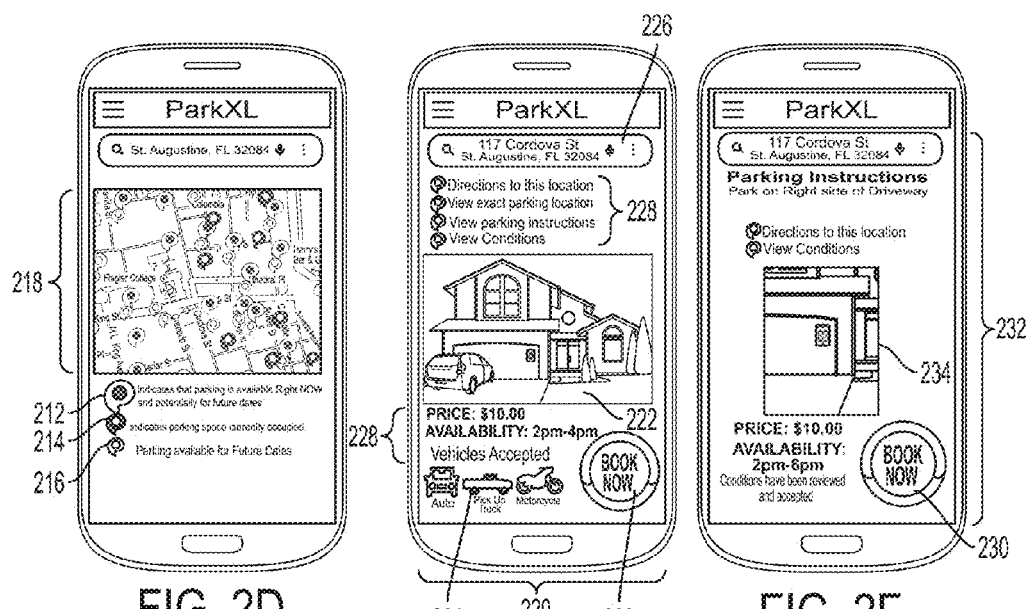

SYSTEM, MEDIA, AND METHOD FOR PARKING MANAGEMENT

CROSS-REFERENCE TO RELATED APPLICATIONS

This application claims the benefit of U.S. Provisional Application No. 62/376,145, filed Aug. 17, 2016, which is incorporated by reference in its entirety.

TECHNICAL FIELD

The present application generally relates to vehicle parking management, and, more particularly, to methods, systems, and media for parker and owner vehicle parking management.

BACKGROUND

Parking often poses a challenge in areas. People seeking parking often waste significant time searching for a parking spot, only to find parking that is very expensive or inconveniently located, if there is any parking available at all. At the same time, property owners often have space available that could be rented for parking. However, such spaces typically go unutilized. Even if an owner puts up a sign stating that a parking space is available for rent, most parkers will not learn of such a space and the owner subsequently misses out on revenue that could be derived from utilization of their available parking. Moreover, parking authorities expend significant resources on parking enforcement, such as meters, enforcement personnel, etc.

Accordingly, a need exists for systems that allow owners to provide parking spots to paying parkers actively seeking parking on mutually-agreeable terms, along with media and methods of use of such systems.

SUMMARY

A computer-implemented method for parking management may comprise receiving, from a parker at a first device, authentication input and then vehicle input that associates a vehicle with the parker, wherein the vehicle input comprises vehicle registration input or selection of a registered vehicle. The method may further comprise subsequently receiving, from the parker at the first device, spot criteria comprising location criteria and temporal criteria. The method may also comprise outputting to the first device, based upon receipt of the spot criteria, spot indicators representing spots based on the location criteria, the temporal data, and characteristics of the vehicle, wherein each spot comprises a stored status. The method may still further comprise subsequently receiving a selection of a spot from the parker at the first device. The method may additionally comprise outputting to the first device, based upon receipt of the selected spot, a graphical representation of the spot corresponding to the spot selected. The method may further comprise subsequently receiving acceptance confirmation input at a second device from an owner of the spot. The method may also comprise outputting, based upon receipt of both the selection of the spot from the first device and confirmation input from the second device, rental confirmation to both the first device and the second device. The method may additionally comprise updating the stored status of the spot to reserved. The method may also comprise receiving, based upon outputting of the rental confirmation, check-in input from the first device or the vehicle. The method may further comprise outputting to the second device an indication of the check-in input based upon receipt of the check-in input. The method may also further comprise updating the stored status of the spot to occupied. The method may additionally comprise subsequently receiving departure input, from the first device or the vehicle, indicating that the vehicle has departed the spot. The method may also comprise outputting departure confirmation to the first device and the second device based upon the received departure input. The method may further comprise updating the stored status of the spot to unoccupied. The method may also still further comprise outputting feedback interfaces to both the first device and the second device.

In another embodiment, a system for parking management may comprise memory and a processor coupled to the memory. The processor may be configured to receive, from a parker at a first device, authentication input and then vehicle input that associates a vehicle with the parker, wherein the vehicle input comprises vehicle registration input or selection of a registered vehicle. The processor may also be configured to subsequently receive, from the parker at the first device, spot criteria comprising location criteria and temporal criteria. The processor may be further configured to output to the first device, based upon receipt of the spot criteria, spot indicators representing spots based on the location criteria, the temporal data, and characteristics of the vehicle, wherein each spot comprises a stored status. The processor may be additionally configured to subsequently receive a selection of a spot from the parker at the first device. The processor may be configured to further output to the first device, based upon receipt of the selected spot, a graphical representation of the spot corresponding to the spot selected. The processor may be also configured to subsequently receive acceptance confirmation input at a second device from an owner of the spot. The processor may be still further configured to output, based upon receipt of both the selection of the spot from the first device and confirmation input from the second device, rental confirmation to both the first device and the second device. The processor may be further configured to update the stored status of the spot to reserved. The processor may be additionally configured to receive, based upon outputting of the rental confirmation, check-in input from the first device or the vehicle. The processor may be also configured to output to the second device an indication of the check-in input based upon receipt of the check-in input. The processor may be additionally configured to update the stored status of the spot to occupied. The processor may be further configured to subsequently receive departure input, from the first device or the vehicle, indicating that the vehicle has departed the spot. The processor may be still further configured to output departure confirmation to the first device and the second device based upon the received departure input. The processor may be also configured to update the stored status of the spot to unoccupied. The processor may be additionally configured to output feedback interfaces to both the first device and the second device.

In yet another embodiment, a non-transitory computer readable medium embodies computer-executable instructions, that when executed by a processor, to execute operations for parking management comprising receiving, from a parker at a first device, authentication input and then vehicle input that associates a vehicle with the parker, wherein the vehicle input comprises vehicle registration input or selection of a registered vehicle. The instructions may also comprise subsequently receiving, from the parker at the first device, spot criteria comprising location criteria and temporal criteria. The instructions may further comprise outputting to the first device, based upon receipt of the spot criteria, spot indicators representing spots based on the location criteria, the temporal data, and characteristics of the vehicle, wherein each spot comprises a stored status. The instructions may additionally comprise subsequently receiving a selection of a spot from the parker at the first device. The instructions may still further comprise outputting to the first device, based upon receipt of the selected spot, a graphical representation of the spot corresponding to the spot selected. The instructions may also comprise subsequently receiving acceptance confirmation input at a second device from an owner of the spot. The instructions may further comprise outputting, based upon receipt of both the selection of the spot from the first device and confirmation input from the second device, rental confirmation to both the first device and the second device. The instructions may still further comprise updating the stored status of the spot to reserved. The instructions may additionally comprise receiving, based upon outputting of the rental confirmation, check-in input from the first device or the vehicle. The instructions may also comprise outputting to the second device an indication of the check-in input based upon receipt of the check-in input. The instructions may further comprise updating the stored status of the spot to occupied. The instructions may still further comprise subsequently receiving departure input, from the first device or the vehicle, indicating that the vehicle has departed the spot. The instructions may also comprise outputting departure confirmation to the first device and the second device based upon the received departure input. The instructions may additionally comprise updating the stored status of the spot to unoccupied. The instructions may further comprise outputting feedback interfaces to both the first device and the second device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically illustrates an authentication screen in a graphical user interface for spot rentals, according to one or more embodiments shown and described herein;

FIG. 2B schematically illustrates menu options in a graphical user interface for spot rentals, according to one or more embodiments shown and described herein;

FIG. 2C schematically illustrates a spot map in a graphical user interface for spot rentals, according to one or more embodiments shown and described herein;

FIG. 2D schematically illustrates another view of a spot map in a graphical user interface for spot rentals, according to one or more embodiments shown and described herein;

FIG. 2E schematically illustrates a view of a spot listing in a graphical user interface for spot rentals, according to one or more embodiments shown and described herein;

FIG. 2F schematically illustrates a view of a spot rental confirmation in a graphical user interface for spot rentals, according to one or more embodiments shown and described herein;

DETAILED DESCRIPTION

Figure 1:
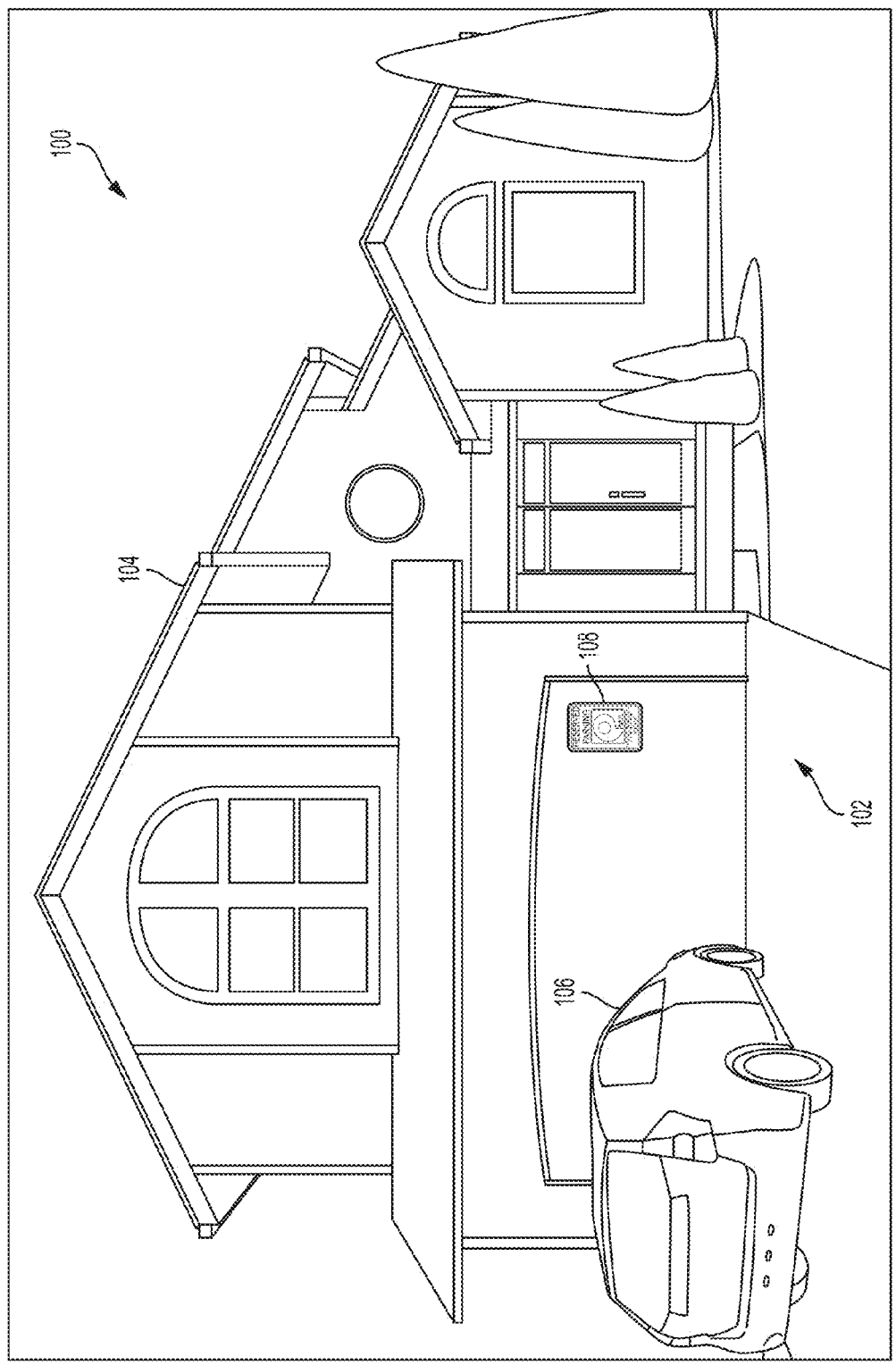
FIG. 1 schematically illustrates an exemplary operating environment featuring a reserved parking spot for rent at a private residence, according to one or more embodiments shown and described herein.

Embodiments of the present disclosure are directed to methods, systems, and media for providing improved parking options for parkers and improved parking management for owners of parking spots. Referring now to FIG. 1, an exemplary view 100 of a parking spot 102 (the terms 'parking spot' and 'spot' may be used interchangeably) is depicted, through which embodiments of the disclosure may be implemented. In this embodiment, the spot 102 is currently unoccupied, suitable for a car, and located in the driveway of a house 104. A vehicle may include anything capable of transporting one or more passengers, including but not limited to cars, recreational vehicles, trucks, motorcycles, bicycles or any other type of passenger-powered vehicles, aircraft, spacecraft, watercraft, and submarines. In this embodiment, a vehicle 106 shares the driveway and is located next to the spot 102. A spot 102 may be located, by way of non-limiting example, along a street, on a rooftop or ramp, in a parking lot, in an undeveloped area such as a field, beach, woods etc., in a garage which may be a residential or commercial parking garage, underground, in an aircraft, watercraft, spacecraft, or any other suitable location or structure in which to park a vehicle. A spot may be private (e.g., a residential property owner), a retail or commercial vendor of parking, or a municipality (or any other public/governmental or quasi-governmental entity or any type of partnership thereof) run system. Payment may be made by the parker in advance and/or any other suitable time. Full or partial payment (and a deposit in some embodiments) may be provided to the owner once received, once the parker arrives at the spot, after the parker departs the spot, and/or any other suitable time.

In this embodiment, a reserved parking indicator 108 is utilized to denote that the spot 102 is reserved and therefore not available for public parking without a reservation. In this embodiment a sign is utilized, but in other embodiments a reserved parking indicator 108 may not be present. In embodiments, a reserved parking indicator 108 may be any type of indicator to provide notice that the spot is reserved, such as visually (sign, electronic display such as an LCD screen, paper, a marking such a painted or imprinted surface, etc.), audio (spoken warning or notification, etc.), tactile (brail, etc.), and/or smell, etc. Through the reserved parking indicator 108, parkers (and the general public) may become aware of the reservation conditions of the space. The reserved parking indicator 108 may provide an opportunity (such as via an invitation presented at the bottom of the signage) to register, such as with a QR (quick retrieval) scan code on the signage, which the user may access via a smartphone camera to immediately access and download a mobile application (wherein the terms 'application' and 'interface' may be used interchangeably herein).

In some embodiments, a notification may be provided electronically such as to vehicles and/or devices (smartphone, computer, tablet, music player, etc.) that the spot 102 is reserved. Embodiments provide an on-line marketplace for facilitating public/private or private/private transactions and rely upon a supply of available parking spaces being offered by users (typically at prices they advertise) being matched to a demand for those spaces. In this fashion, an owner may choose a price for the parking space.

Turning now to FIG. 2A, a graphical welcome screen interface 200 is shown according to various embodiments. This and any interface depicted herein may be implemented on any suitable type of device, which may include by way of non-limiting example, smartphone, tablet, laptop, in-car device, desktop, wearable devices, holographic displays, etc. A location option 202 may be provided to allow selection of a location, manual entry of a location, or utilization of any suitable type of location service (GPS, etc.) utilized by the device on which the graphical welcome screen interface 200 is shown, such as a vehicle, a user, or any other device capable of providing a location. One or more role selection options 204 may be provided. In this embodiment, role selection options 204 allow for selection of whether to authenticate as a parker or an owner. In other embodiments, role selection options 204 may allow for authenticating as both and/or include other roles such as administrator (elevated privileges), a delegated user, guest or anonymous user, validator (a party offering validation of spots), trial-period user, demo user, etc. Any suitable form of authentication may be utilized, such as username/password, swipe gesture, two-factor authentication, biometric identification, etc.

Turning now to FIG. 2B, a graphical index open interface 206 is shown according to various embodiments. In one embodiment, once a user has been authenticated, menu options 208 may be presented, such as account history, account and/or program settings, payment options (including advance payment options) and/or history, help options, notification options, news options, a 'rent your space' option (which may apply owners that already have a registered space or anyone that wants to register a space), a section about the application/software/interface, etc. In other embodiments, other suitable options may be presented, which may vary depending upon an individual user, role type, vehicle type, spot type, geographic area, etc. Still other embodiments may include credit card information being provided by the parker at the time of setting up of the initial account, for purposes of depositing payments, electronic funds, etc.

In various embodiments, a parker registers one or more vehicles which may become associated with the parker. In some embodiments, more than one parker may be associated with a vehicle, although other embodiments may restrict to a single parker per vehicle. In some embodiments, a parker manually enters at least some vehicle data (vehicle identification number or VIN, make, model, color, dimensions, special/customized features, etc.) to describe and/or uniquely identify the vehicle. In other embodiments vehicle identification data may be assisted or partially/entirely automatic based upon receipt of a VIN number, a photo of the license plate, and/or a photo to at least partially identify the vehicle (for example, performing image recognition upon the vehicle to determine the make/model/color/year but not necessarily uniquely identifying it). In some embodiments, data may pulled from external sources/databases (state car registration agencies, departments of motor vehicles, etc.) that may be used to verify and/or confirm the validity and/or legality of a vehicle and/or an ownership claim (e.g., such as determining that a car has been flagged as stolen). A parker may be asked or required to provide one or more photographs of their vehicle in some embodiments, although other embodiments may not require and/or utilize photos or other visual identifiers.

In some embodiments, a parker may be renting/purchasing a vehicle, such as from a rental agency or dealership or private owner. The parker may be presented with various vehicles from which to choose. If a parker has multiple registered vehicles, a default vehicle may be designated and switched at any time in embodiments. Upon selection, a chosen vehicle may be associated with the parker and available in the graphical user interface for the parker's present and future use. In some embodiments this may be a time-limited association, such as with a vehicle lease, where the graphical user interface may present duration information regarding time remaining in the lease.

In various embodiments, an owner registers one or more spots which may become associated with the owner. In some embodiments, more than one owner may be associated with a spot, although other embodiments may restrict to a single owner per spot. In some embodiments, an owner manually enters any/all spot data (address, type of spot, dimensions, surface(s), colors, gradient, amenities, etc.) suitable to describe and/or uniquely identify the spot. In some embodiments, image recognition may be utilized to uniquely identify the spot by entering an address, taking a photo of the spot, and/or identifying the type of spot. In some embodiments, data may pulled from external sources (such as mapping software based on a geotagged location, an entered/selected address, etc.) which may be used for a variety of purposes, including to identify, verify, and/or confirm the validity and/or legality of a spot and/or an ownership claim (e.g., such as determining that a spot is a valid spot). An owner may be asked or required to provide one or more photographs of their spot in some embodiments, although other embodiments may not require and/or utilize photos or other visual identifiers.

Turning now to FIG. 2C, a spot map 210 in a graphical user interface for spot rentals is shown according to various embodiments. In this embodiment, various spot indicators are displayed, such as a current availability indicator 212, a currently-occupied indicator 214, and a future availability indicator 216. Future availability indicators 216 may be presented on behalf of owners who may want to rent a space for special events, such as a concert, parade, holiday, etc. In other embodiments, an owner may also be able to view available spots to see the competition in the marketplace. In various embodiments, an owner may be able to view parkers currently seeking spots, which may include current or approximated locations of parkers. Parkers in some embodiments may be able to view other parkers, such as to have an idea of the current competition for spots in an area.

Turning now to FIG. 2D, a closer spot map view 218 in a graphical user interface for spot rentals is shown according to various embodiments. In some embodiments, a parker may zoom in or otherwise indicate an area or spot interest, which may provide a closer view of the area, which may change the number of indicators shown within a region (such as increasing the number of indicators shown within a region when zooming in, and vice-versa).

Turning now to FIG. 2E, a spot listing 220 as presented in a graphical user interface is shown according to various embodiments. In embodiments, a spot listing 220 may provide visual spot representations 222 and/or descriptive information of the available parking spot (such as a private homeowner with available driveway parking or other private property accessible parking, a commercial retailer with available and designated non-commercial spaces to be provided to a parker for a purpose other than that which the retailer is typically engaged, or other provider). In this embodiment, after selecting a spot in the closer spot map view 218, a visual spot representation 222 may be presented to the parker, which may be a representation of the general area, such as the exterior of a parking garage. In other embodiments a visual spot representation 222 may be of the spot itself. In various embodiments, a visual spot representation 222 may be in the form of a photograph (such as the front of a driveway as depicted here), a virtual/computer-rendered image, etc.

Some embodiments may utilize a virtual tour/street view, video, audio, and/or any other type of representative data to represent a visual spot representation 222 to parkers. In other embodiments, visual spot representations 222 may be optional or not used. In still other embodiments, photos from parkers may be utilized, such as by crowd-sourcing, although some embodiments may provide owners with control over what visual spot representation(s) 222 are utilized. Other information may include hours to park and/or types of vehicles accepted 224, which may be in graphical (icon, photo, etc.), and/or text form. Spot address information 226 may be provided and/or additional spot information 228 may include directions to the spot, price, viewing the spot in more detail, parking instructions, terms/conditions, etc. A booking option 230 may be presented in some embodiments to immediately rent the spot. In other embodiments, a booking option 230 may present a rental offer to an owner who can then approve, reject, and/or defer a decision.

Turning now to FIG. 2F, a spot rental confirmation interface 232 in a graphical user interface is shown according to various embodiments. A detailed spot view 234 may be presented, where in some embodiments a general representation 222 is also provided in the interface to provide more context of the area in which the spot is located. A booking option 230 may be presented here in some embodiments, whereas in other embodiments the booking option 230 may not be presented until the spot rental confirmation interface 232.

Figure 3:
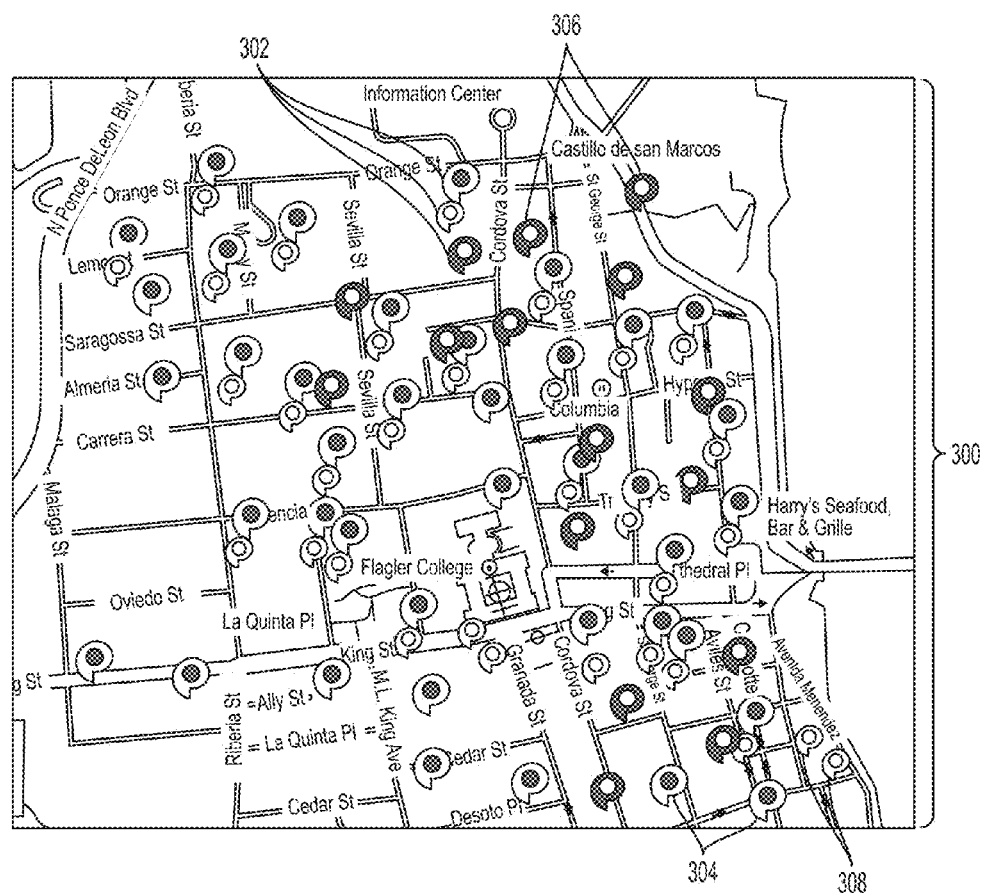
FIG. 3 schematically illustrates a graphical user interface for spot selection on a map in a graphical user interface for spot rentals, according to one or more embodiments shown and described herein.

Turning now to FIG. 3, a graphical map interface 300 is shown according to various embodiments. In some embodiments, spot indicators 302 may be shown and updated in the graphical map interface 300. In this embodiment, there are several types of spot indicators 302, such as current availability indicators 304, currently-occupied indicators 306, and future availability indicators 308. In some embodiments, the interface receives vehicle selection input from a parker to select from among a plurality of registered vehicles and outputs a modification of available spots based upon input that switches a vehicle choice from among the plurality of registered vehicles.

In various embodiments, the interface outputs a photo or computer-rendered image of the spot corresponding to the selected spot. In some embodiments, the interface may output a recommended registered vehicle or a vehicle suitability rating based upon a comparison of spots available for each of a plurality of registered vehicles within a same geographic area. For example, if a parker is selecting a vehicle to rent on a trip, a smaller vehicle may have more parking options than a larger vehicle. The parker may be provided with a general recommendation and/or a mapping of available spots available per-vehicle to provide the parker to see for comparison.

In various embodiments, the interface may rate spots with respect to the parker at the first device based upon traffic conditions in routes to the rated spots. For example, if traffic is congested on a certain route, spots along that route may receive a lower suitability rating with respect to the parker as compared with spots not located along the congested route. In some embodiments, the interface may output one or more advertisements based upon spot location, vehicle location, parker location, and/or owner location. Other embodiments may utilize advertisements based upon current or reservation times.

In various embodiments, the interface may output, based upon receipt of the spot criteria, spot indicators 302 representing residential spots and commercial spots. Residential spots may be denoted by a residential spot graphical representation that differs from commercial spot graphical representations.

Parkers, vehicles, owners, and/or spots may have feedback ratings. In some embodiments, the interface may output a spot rating and an owner rating, and/or receive filtering criteria relating to a spot rating and/or an owner rating. In this embodiment, the interface may also output a parker rating and/or receive from the second device filtering criteria relating to a parker rating. For example, a parker may filter spots and/or owners to only see those that have at least a minimum specified feedback rating. Other filter criteria may include filtering, for example, by crime/safety rating (such as quantity, recency, severity, and/or proximity of crime to a spot).

In some embodiments, a car identifier may be received from other apps, such as a car rental or purchasing app. In this example, a showing of spots that would be available in a city, based upon car rental/purchase options on a map of spots. In various embodiments, if a parker leaves a spot early, the parker may be able to resell/sublease the spot to another parker. In some embodiments an owner may specify that a parker may resell/sublease the rental term, provided that, for example, the new parker has at least a certain feedback rating and/or the owner get a certain percentage cut of the sublease. In some embodiments, the application/interface may provide any data described herein to other applications/interfaces. For example, parking data described herein may be output/provided/sold to a navigation or vehicle rental program.

In various embodiments, the interface may output amenity information pertaining to each spot indicator 302. For example, spot indicators 302 may include indications (colors, graphics, hover-effects, etc.) of any type of amenity (security gate, covered parking, near public transportation, etc.). In some embodiments, the interface may receive an inclement weather forecast pertaining to each spot indicator 302 based upon temporal data received from the first device and the geographic location corresponding to each spot indicator 302. In this embodiment, the interface may also output recommendations for spot indicators 302 whose probability of inclement weather is less than a threshold value/range and/or for spot indicators 302 featuring covered parking where the probability of inclement weather exceeds the threshold value or range. For example, facing a chance of rain, a parker may only want to see spots that are either covered or are located in an area that has less than a certain percentage chance of rain.

In various embodiments, the interface may output a notification when a spot corresponding to a spot indicator 302 is scheduled to become available. For example, a parker may want to be notified when a desired spot is either available or when the spot is projected to become available. In some embodiments, the interface may indicate spots reachable by the parker within an event start time, as determined by travel times based upon traffic conditions for routes between the current location of the parker and a location corresponding to the spot indicator 302. In some embodiments, this may be based on a determination of where the parker/vehicle will be located, which may be determined, for example, based upon a projected location (based upon a current travel path of the parker) and/or a future location and time specified by the parker.

In various embodiments, the interface may filter spot indicators 302 based upon historic availability data. For example, a parker may filter spots having at least a specified availability based upon the historical availability data of each spot. In some embodiments the interface may receive a notification threshold value corresponding to an amount of time prior to expiration of a spot rental. In this embodiment the interface may also provide, based upon the notification threshold value, an option to extend the spot rental.

In various embodiments, the interface may receive a bid amount and output an indication of which spot indicators 302 correspond to prices equal to or less than the bid amount. In some embodiments, the interface may receive a rental price from an owner and output an indication of which spot indicators 302 correspond to bids from parkers that are equal to or exceed the rental price. For example, a parker may place a bid for a spot rental for a period of time (which the parker may specify there is flexibility) and see if any owners will agree to rent a spot at that price or, in some embodiments, if an owner has a counter-offer. In another example, an owner may list a price for a spot and receive counter-offers from parkers, while also being able to weigh these counter-offers against (or filter counter-offers by) the parker and/or the vehicle's feedback rating.

In various embodiments, parking validation may be a searchable option for parkers, and may be something offered by owners. Parkers may also be able to view parties offering validation for a spot and identify which spots the validating party offers validation. In some embodiments validation may be in the form of a discount, free extra time, or any other suitable incentive. In various embodiments validation may be obtained by fulfilling a requirement in advance, such as prepaying a transaction with the validating party. In various embodiments a parker may be able to search for validating parties based upon terms/conditions, such as a parker needing a spot for 2 hours may filter to see only those validators who offer validation where a two hour visit to the validating party would qualify for validation.

In some embodiments the interface may receive terms or conditions from the parker and output an indication of which spot indicators 302 correspond to terms and/or conditions (hours to park, types of vehicles accepted, subleasing, etc.) compatible with the terms and/or conditions received from the parker. In some embodiments, a lease of a spot may require agreement between the terms/conditions of a parker and a seller. A parker and/or seller may have pre-specified terms/conditions, which they may be able to modify in some embodiments in order to reach a deal with the other party.

In various embodiments, the interface may output authentication credentials to a parker and an owner for creating anonymized communication between them. The owner and parker may be provided voice, email, chat, texting, video chat/messaging, and/or any other suitable form of communication that may be tokenized/anonymized to protect the privacy of each party. In some embodiments, only one party may stay anonymous, which may also be specified in the terms/conditions of that party. In some embodiments, the interface may output spot indicators 302 that are only visible to a parker belonging to a defined subset of all registered parkers. For example, a parker may obtain, earn, and/or purchase membership in a VIP group which may provide exclusive or preferred access to certain spots not available to other parkers that are not members of that group, where those certain spots may in turn belong to owners that belong to a specific group. In another example, a group of owners may gain access to desirable parkers (such as those above a certain feedback level) before other owners are made aware that such desirable parkers are currently looking for a spot in the area.

Figure 4:
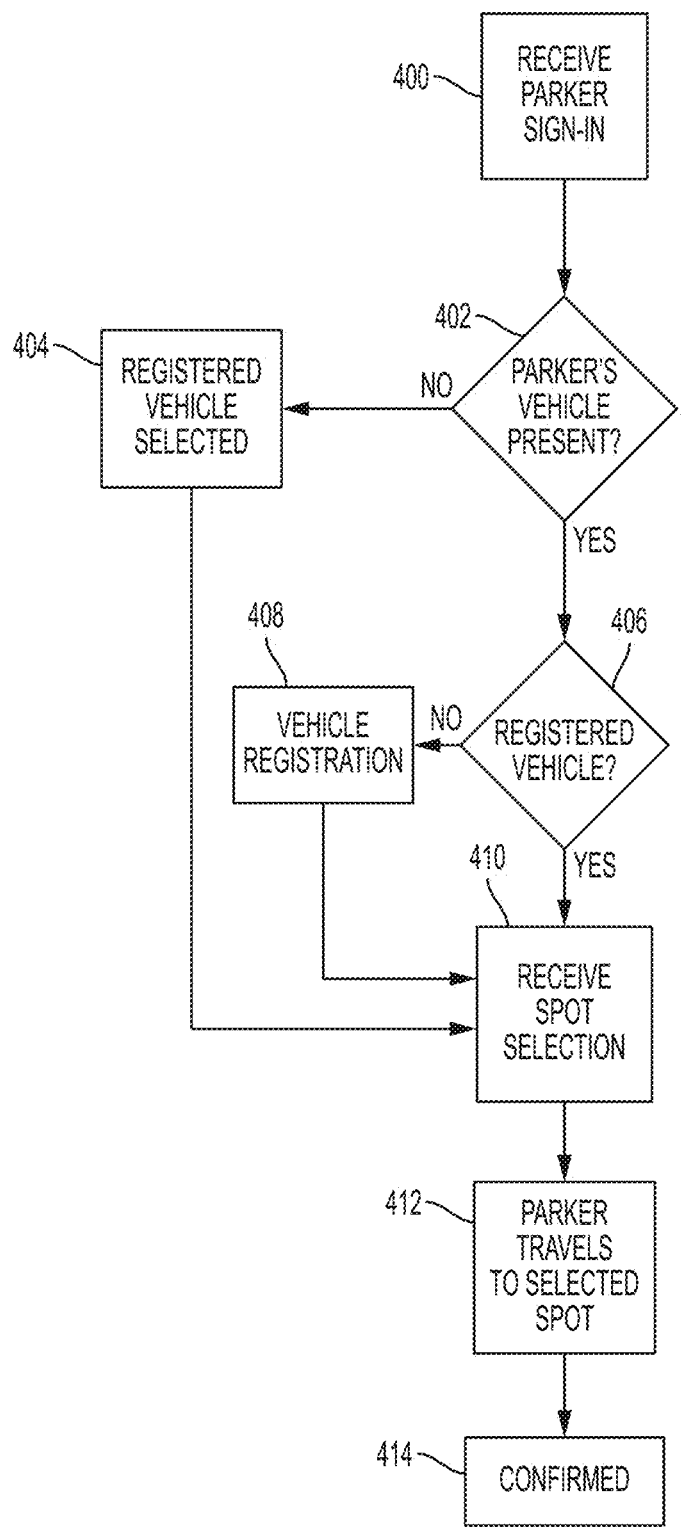
FIG. 4 is a flow chart depicting registration of a vehicle and a spot reservation by a parker in a graphical user interface for spot rentals, according to one or more embodiments shown and described herein.

Turning now to FIG. 4, a flowchart depicting registration of a vehicle and a spot reservation by a parker in a graphical user interface for spot rentals is shown according to various embodiments. At 400, a parker is authenticated through signing in, although as discussed above, any suitable authentication mechanism may be utilized in other embodiments. At 402, a determination is made as to whether the parker has a vehicle present. This may be determined, for example, by input from the parker and/or detection of a vehicle (utilizing any suitable vehicle tracking technology such as GPS, near field communication (NFC), radio-frequency identification (RFID), etc.). If no vehicle is detected, then at 404 a registered vehicle is selected by the parker. In some embodiments, if the parker does not have a registered vehicle, the parker can manually enter/select information about a vehicle to register the vehicle that is not present. In various embodiments, a parker may select from multiple vehicles, such as when renting a vehicle from a rental agency or buying a vehicle from a dealership, even if the parker is not physically at the rental agency or dealership. After a registered vehicle is selected at 404, a spot selection is provided by the parker at 410.

Returning to 402, if the parker has a vehicle present, a determination may be made at 406 as to whether the vehicle is registered. If the vehicle is registered, then a spot selection may be provided by the parker at 410. If the vehicle is not registered, then in some embodiments at 408 the parker may manually enter/select information about the vehicle to register, such as taking a photo of the license plate or a photo of the vehicle generally (utilizing image recognition, for example) to register the vehicle. In some embodiments, a photo may have identifying information present in the photo (license plate, faces, signs) blurred for obfuscation. At 410, a spot selection has been provided by the parker, which in this embodiment may lock in the rental, although in other embodiments owner confirmation may be required. At 412, the parker travels to the selected spot to park the vehicle. In some embodiments, as discussed above, directions to the spot may be provided. At 414, occupation of the spot by the parker may be confirmed. In some embodiments, this may be based on the parker confirming through an interface that the vehicle is now parked in the spot. In other embodiments this may automatically be confirmed by the presence of the vehicle in spot utilizing location services (GPS, NFC, RFID, etc.). In still other embodiments, the presence of the vehicle in the spot based on location services may be subject to confirmation from the parker and/or owner.

Figure 5:
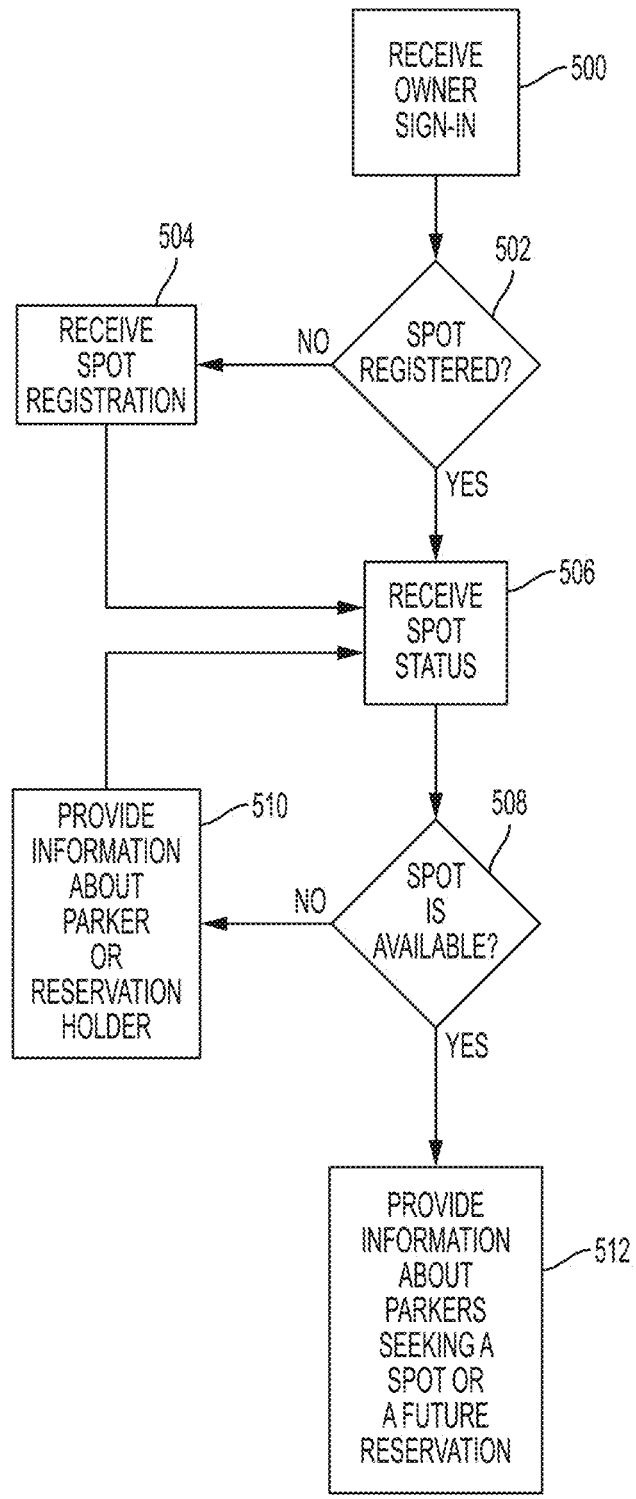
FIG. 5 is a flow chart depicting registration and confirmation of rental of a spot by an owner in a graphical user interface for spot rentals, according to one or more embodiments shown and described herein.

Turning now to FIG. 5, a flowchart depicting registration and rental of a spot by an owner in a graphical user interface for spot rentals is shown according to various embodiments. At 500, a parker is authenticated through signing in, although as discussed above, any suitable authentication mechanism may be utilized in other embodiments. At 502, a determination is made as to whether a spot belonging to the owner is registered. If the spot is not registered, then at 504 the spot is registered by the owner, where spot information may be entered or selected by the owner and may include information such as address, type of spot, dimensions, surface type(s), color(s), amenities (covered parking, gated, security, vehicle detailing/washing, charging available, etc.), gradient, etc. Registration, in some embodiments, may also be at least partially based upon location data and/or image recognition. In some embodiments, for example, a geotagged photo may provide sufficient information even if the owner is not located at the spot at the time of registration.

Once the spot is registered, or if at 502 the spot was previously registered, then at 506 the owner may be presented with the status of the spot. Spot status may include being available, occupied, reserved (for example, where a parker has reserved the spot and is en route to the spot), subject to one or more reservation requests and/or bids from parkers. At 508, a determination is made as to whether the spot is currently available. If the spot is not currently available, which may include by way of non-limiting example the spot being currently occupied or currently reserved by a parker (such as when the parker is en route), then at 510, information may be provided to the owner regarding the parker and the associated vehicle that occupies the spot or has a reservation for the spot. The owner may also receive information about the expiration of the current reservation, and options to provide to the current occupant to extend the lease. The flowchart then returns to 506 to receive current spot status. Alternatively, if the spot is currently available at 508, then at 512 the owner may be provided with information about future reservations of the spot and/or regarding parkers currently seeking spots (for example information about parkers, their cars, and criteria specified by the parkers).

Figure 6:
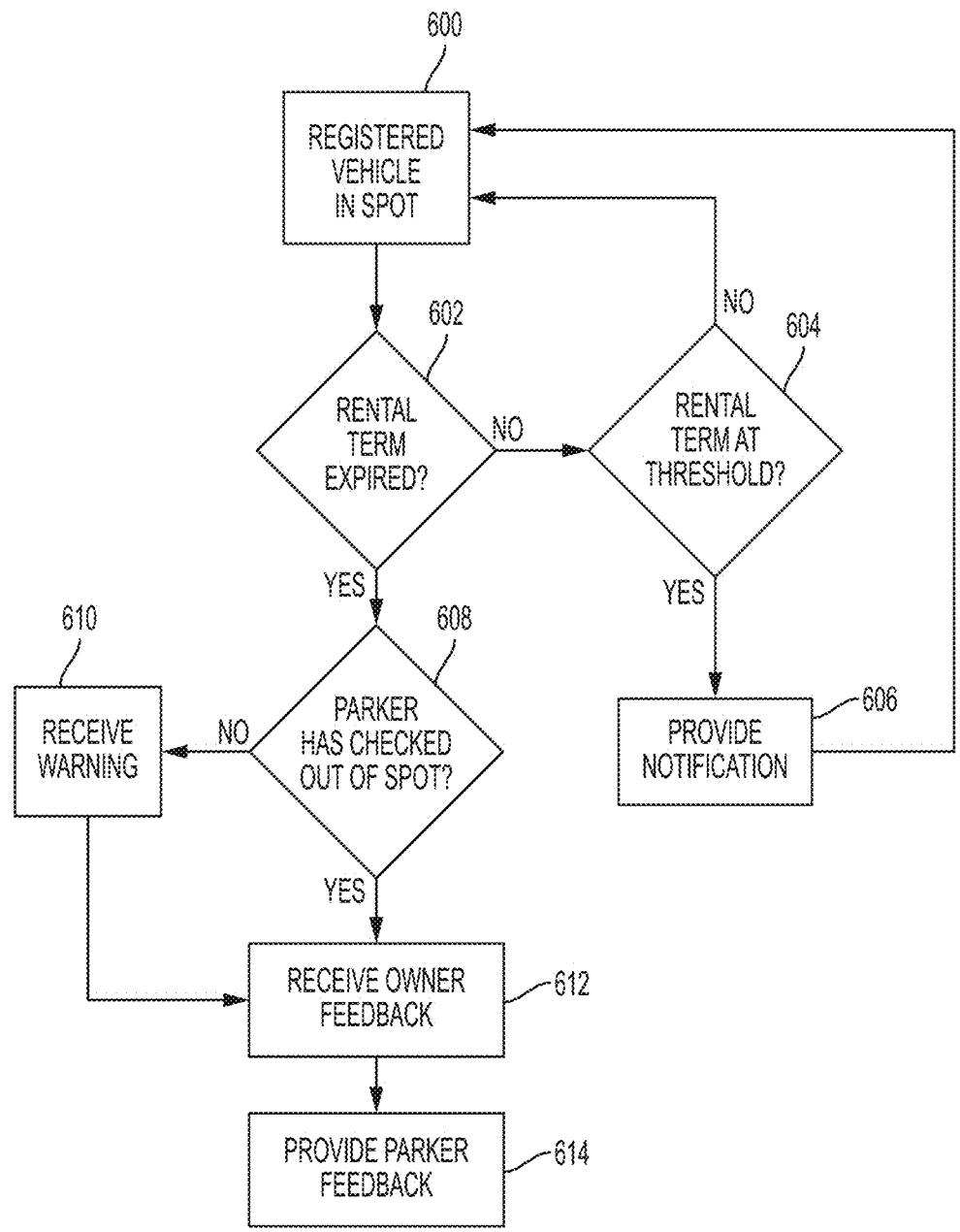
FIG. 6 is a flow chart depicting a parker checking out of a spot in a graphical user interface for spot rentals, according to one or more embodiments shown and described herein.

Turning now to FIG. 6, a flowchart depicting a parker checking out of a spot in a graphical user interface for spot rentals is shown according to various embodiments. At 600, a parker's registered vehicle may be present in a registered spot being leased by the parker from an owner. At 602, if the rental term has not yet expired, a determination is made at 604 as to whether the rental term is at a threshold, in some embodiments. If at 604 the rental term is not at a threshold, the interface may return to 600. If at 604 the rental term is at a notification threshold, then a notification may be provided to the parker at 606 in various embodiments. A notification may include (by way of non-limiting example) an indication that the rental term will expire, an indication that the amount of time remaining in the rental term, an offer to extend the rental, an offer for a different spot, etc. At this point, the interface may return to 600.

Returning to 602, if the rental term has expired, then in some embodiments at 608 a determination is made as to whether the parker has checked out of the spot. If the parker has checked out of the spot, then at 612 the parker and/or the parker's registered vehicle may receive feedback from the owner and then proceed to 614. Returning to 608, if the parker has not yet checked out of the spot after the rental term has expired, then the parker may receive a warning at 610 in some embodiments. In various embodiments, the parker may be alerted once a tow truck has been requested and/or is en route to remove the parker's registered vehicle, and the interface may proceed to 612. At 614, the parker may provide feedback regarding the owner and/or the spot. In some embodiments, the owner and parker may provide feedback (at 612 and 614, respectively) after 608 and/or 610, irrespective of when (or if) the other party has provided feedback. In various embodiments, feedback may include a rating and/or a textual/audio/video description.

Figure 7:
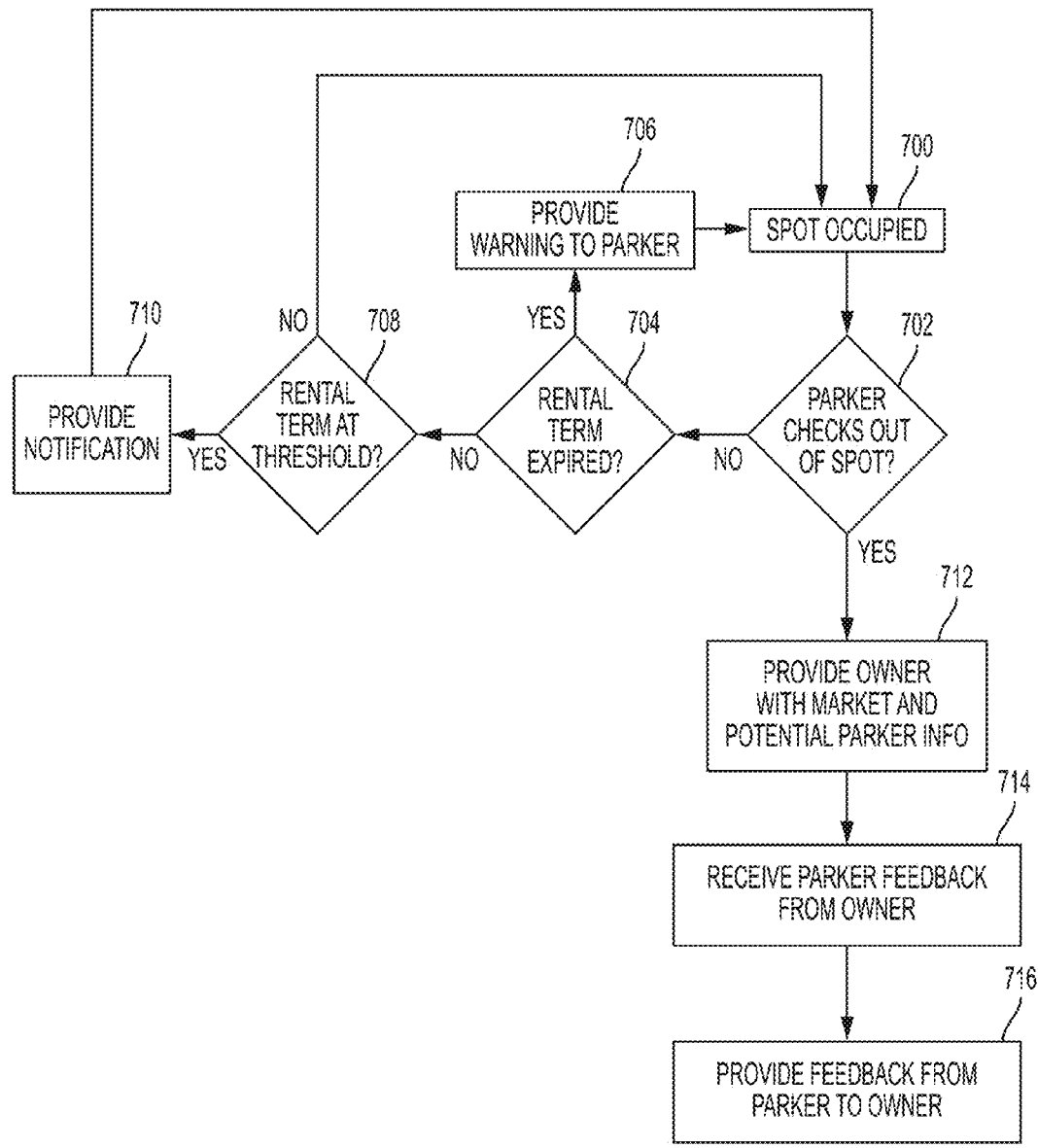
FIG. 7 is a flow chart depicting an owner's spot where the parker has checked out of the spot in a graphical user interface for spot rentals, according to one or more embodiments shown and described herein.

Turning now to FIG. 7, a flowchart depicting an owner's spot where the parker has checked out of the spot in a graphical user interface for spot rentals is shown according to various embodiments. At 700, a registered spot is occupied by a registered vehicle. In some embodiments, the spot may be reserved but not currently occupied. At 702, if a parker has not yet checked out of the owner's spot, then at 704 a determination may be made as to whether the parker's rental term has expired in some embodiments. If the rental term has expired, then at 706 the owner may provide a warning to the parker and/or charge the parker a penalty/additional fee in various embodiments, and the interface may return to 700. Returning to 704, if the rental term has not yet expired, then a determination may be made in some embodiments at 708 as to whether the rental term is at a notification threshold. If not, then, the interface may return to 700. If the rental term at 708 has reached a notification threshold, then at 710 a notification may be provided directly or indirectly by the owner at 710 in some embodiments. A notification may include (by way of non-limiting example) an indication that the rental term will expire, an indication of the amount of time remaining in the rental term, an offer to extend the rental, an offer for a different spot, etc. At this point, the interface may return to 700.

Returning to 702, if the parker has checked out of the owner's spot, then at 712 the owner may be provided with market and/or potential parker information, in some embodiments. Market information may include information regarding other registered spots within an area, such as within an area near the owner's registered spot (whether the area is determined by the interface and/or provided by the owner) and/or information regarding potential parkers, such as parkers in the area and/or parkers looking for a spot (such as in an area near the owner's registered spot). At 714, the owner and/or the owner's spot may receive feedback from the parker. At 716, the owner may provide feedback regarding the parker and/or the parker's registered vehicle. In some embodiments, the owner and parker may provide feedback (at 714 and 716, respectively) after 702 and, irrespective of when (or if) the other party has provided feedback. In some embodiments, the owner may be provided with market information and/or potential parker information at any point. In various embodiments, feedback may include a rating and/or a textual/audio/video description.

In embodiments, owners may sign up with their information (name, address, etc.) and define the property owned along with a description of vehicles allowed to park. By non-limiting example, the owner may own a 2 lane driveway with room for 1 car and 1 RV up to 25 feet or may be enough room to park a 45 foot truck/trailer, or may be a 100 foot dock that could hold 4 boats of length to 25' apiece. In a typical transaction within this example, a parker could be required to provide a copy of their driver's license, photo of the vehicle including a listing of its license plate/tag number or VIN number, and a description of the vehicle. This can also include provisions made for rental vehicles using one or more of the above parameters and the system may also be used with recreational vehicles. In embodiments, the owner may list their price per hour to park and may have the option of activating their application/interface (and offering their space for lease) only at dates/times the owner desires. This may be accomplished in this example by the owner by activating/turning on the application/interface, at which point the signal becomes available for anybody looking to park in their area. In some embodiments, if the owner does not want their driveway used for parking at this time, the owner may turn off the application/interface. In other embodiments, the owner would need to specify that the spot is not currently available. In still other embodiments, the owner may be able to select an option to temporarily make their spot unavailable for a specified period and/or until the owner specifies otherwise.

In various embodiments, the parker may sign (electronically or otherwise) that they (and not the owner) are responsible for their vehicle and contents. Other embodiments may provide for the availability of insurance at a cost to the parker. In this example, the parker may then open the application/interface on their mobile phone or computer. On their phone, in this example, the parker may be able to check parking spaces available for their type of vehicle within x-miles of their location (GPS) and choose a spot, click, and pay for the length of time that they would wish to use (lease) that spot. In some embodiments, an owner may be paid prior to the arrival of the parker's vehicle, such as via a payment architecture that may be built into the application/interface. Some embodiments may utilize communications technology built both into the application/interface and associated signage to defer payment until the parker is in the leased space. This example may include, upon completing the transaction for leasing a space, the parker receiving a text, quick retrieval code or the like. Continuing with this example, upon pulling into the owner's space, this may cause this code to be interfaced with a sensor built into the signage (such as via NFC or Bluetooth) and to ensure that the parker is not charged for a space already occupied.

In other embodiments, the owner may view the name of the parker and a photo of the driver and the vehicle. The parker may see a photo of the home-business where parking is available, such space being carefully defined. In this example, the vehicle would be locked and the keys would stay with the parker. In some examples, the owner may be paid immediately upon booking by the parker. This may be paid by a credit card from the parker that is listed prior to their using the mobile app, so that no personal contact would be necessary in this embodiment.

Some embodiments build in safeguards to ensure that, if a parker stays beyond the time agreed upon, the parker may automatically be charged an amount of additional time. The owner may state the times that parking would be available on their property, where an overstay may result in additional charges, which may include a towing option (at the parker's expense and could constitute an initial term of their contract) which can be added by the city, owner, etc., and should the parker remain beyond a specified time. Embodiments may utilize NFC technology or other suitable wireless communication protocols that can be built into the signage, bumper, pavement, etc., associated with the spot can be continually interfaced with a signal issued from the vehicle (e.g., via a windshield sticker) so that, upon the vehicle being a minimal distance from the sign (evidencing the parker leaving the location) metering of additional parking (overcharge) may be discontinued.

Some embodiments may incorporate technology into more streamlined and cost efficient rental of commercial lots or municipalities (or other governmental entities), with parker and/or owner accounts being available for businesses as with individuals. Commercial accounts may receive a higher percentage of the fee by registering more locations and/or vehicles. In one embodiment, a designated number of reserved parking spots would be numbered so that a parker would know which spot has been reserved (and does not take the wrong spot). This could also include any number of spots, such as marked "Reserved Parking for (insert provider)" signs just next to the handicap signs in parking lots.

Embodiments may allow the parker to book and pay for parking in advance and book additional time in the same location. In these embodiments, the parker learns of available spots by viewing the app (or website) and, once a parker leaves a location, the parker must check out on the app, which opens the spot for new parkers and stops the billing of the current parker. Other embodiments may allow for detection of the vehicle leaving (or having left) so serve as a de facto checking out. In some embodiments, a parker may receive a notice on their smartphone at a set time interval (e.g., 15 minutes or a different amount of time) prior to the expiration of their parking space, so that they can return to the parking space and leave, or extend the parking time for an additional increment. The parker may be paid in advance, incremental amounts set by the owner and/or parker, the proceeds being sent immediately to the owner. In other embodiments, and as previously described, interfacing technology (such as NFC) may be built into both the signage and a vehicle applique (or mobile app QR code) in order to complete the transaction when the parker pulls into the owner's space in communication with a processor integrated into the signage. In this manner, the owner can know exactly who should be renting the parking space at any given time because the parker may be required to register with a photo of their driver's license and a photo of their vehicle, including such as their vehicle license plate. If anyone other than the current parker (paid in advance) is located in the reserved parking location, the owner (such as a city or private owner) can fine, ticket and/or tow the offender (and may be credit some funds to the parker who has booked that location, but found the unpaid auto in their reserved spot). In some embodiments, parkers may act as or be utilized as "Meter Maids" and help monitor the owner, as they can contact the owner (such as via the application/interface) to notify individuals that they are parked illegally.

Embodiments may also provide for both short and long term leasing options and/or utilize encryption. Embodiments may also include the ability to preset, in advance, future dates and times in which the space is available for lease. Other aspects can include a rating/feedback functionality to provide feedback regarding owners, spots, parkers, and/or vehicles. Some embodiments may include utilizing existing web or mobile app accessible mapping programs (such as through an API) as part of the system and which can be viewed by a parker and/or an owner, whereas other embodiments may utilize a dedicated mapping program which can be custom produced for use with a cloud, mobile app, and/or website-based system. In various embodiments, a dispute process for resolving disagreements may be utilized, such as where a parker pays for a space and someone else has occupied that space. In such an instance, the parker can send a time stamped photo of the license plate and vehicle of that other vehicle to the owner of that space. Once sent to the owner, the parker may then receive a refund (full, prorated, above the full amount, etc.). Other embodiments may include the parker being required to check out on the application/interface when leaving the space and which will re-open the space (if requested by the owner). Some embodiments may make the owner responsible for vetting the trustworthiness of any towing company that they choose to tow any unlawful parker and/or overstayed parker.

Figure 8:
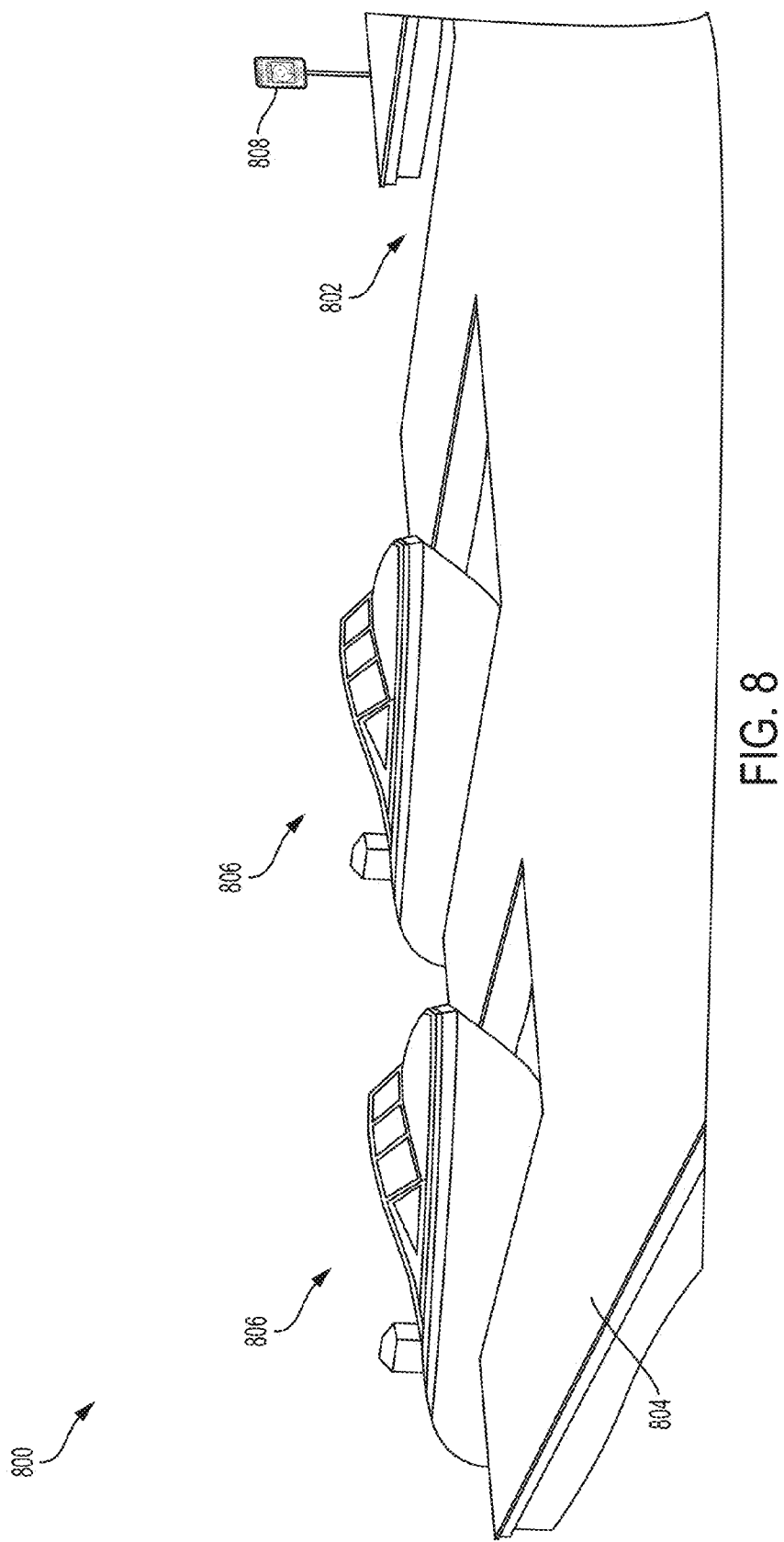
FIG. 8 schematically illustrates an exemplary operating environment featuring a reserved parking spot for rent for docking of boats, according to one or more embodiments shown and described herein.

Turning now to FIG. 8, an exemplary view 800 of an alternate embodiment depicts a spot 802 that is available to dock/park/secure a watercraft (depicted in this embodiment as a boat) at a dock 804, through which embodiments of the disclosure can be implemented. In this embodiment watercraft 806 are depicted in other locations near the spot. The spot 802 may be located, by way of non-limiting example, in water (at/near a dock, near land or any type of structure), out of water, etc., or any other suitable location or structure in which to park a watercraft. A reserved parking indicator 808 may be utilized to denote that the spot 802 is reserved and therefore not available for public parking without a reservation.

Figure 9:
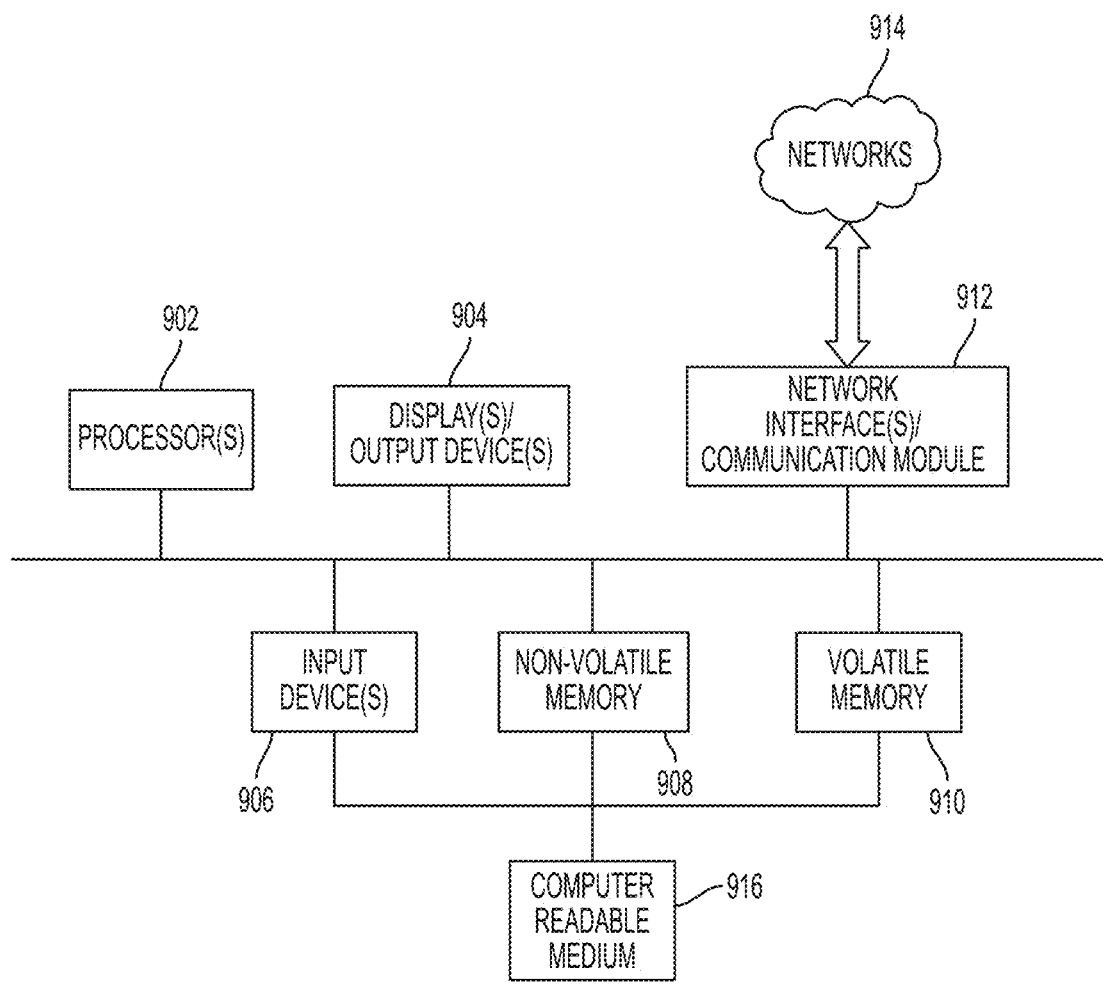
FIG. 9 is a block diagram illustrating computing hardware utilized in one or more devices for implementing various processes, media, and systems, according to one or more embodiments shown and described herein.

Turning to FIG. 9, a block diagram illustrates an example of a computing device 900, through which embodiments of the disclosure can be implemented, for example in a management computing hub 914. The computing device 900 described herein is but one example of a suitable computing device and does not suggest any limitation on the scope of any embodiments presented. Nothing illustrated or described with respect to the computing device 900 should be interpreted as being required or as creating any type of dependency with respect to any element or plurality of elements. In various embodiments, a computing device 900 may include, but need not be limited to, a desktop, laptop, server, client, tablet, smartphone, or any other type of device that can compress data. In an embodiment, the computing device 900 includes at least one processor 902 and memory (non-volatile memory 908 and/or volatile memory 910). The computing device 900 can include one or more displays and/or output devices 904 such as monitors, speakers, headphones, projectors, wearable-displays, holographic displays, and/or printers, for example. The computing device 900 may further include one or more input devices 906 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 900 may include non-volatile memory 908 (ROM, flash memory, etc.), volatile memory 910 (RAM, etc.), or a combination thereof. A network interface 912 can facilitate communications over a network 914 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 912 can be communicatively coupled to any device capable of transmitting and/or receiving data via the network 914. Accordingly, the hardware of the network interface 912 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 916 may comprise a plurality of computer readable mediums, each of which may be either a computer readable storage medium or a computer readable signal medium. A computer readable storage medium 916 may reside, for example, within an input device 906, non-volatile memory 908, volatile memory 910, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 900 may include one or more network interfaces 912 to facilitate communication with one or more remote devices, which may include, for example, client and/or server devices. A network interface 912 may also be described as a communications module, as these terms may be used interchangeably.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method for parking management, comprising:
   receiving, from a parker at a first device, authentication input and then vehicle input that associates a vehicle with the parker, wherein the vehicle input comprises vehicle registration input or selection of a registered vehicle;
   subsequently receiving, from the parker at the first device, spot criteria comprising location criteria and temporal criteria;
   outputting to the first device, based upon receipt of the spot criteria, spot indicators representing spots based on the location criteria, the temporal criteria, and characteristics of the vehicle, wherein each spot comprises a stored status;
   subsequently receiving a selection of the spot from the parker at the first device;
   outputting to the first device, based upon receipt of the selected spot, a graphical representation of the spot corresponding to the spot selected;
   subsequently receiving acceptance confirmation input at a second device from an owner of the spot;
   outputting, based upon receipt of both the selection of the spot from the first device and confirmation input from the second device, rental confirmation to both the first device and the second device;
   updating the stored status of the spot to reserved;
   receiving, based upon outputting of the rental confirmation, check-in input from the first device or the vehicle;
   outputting to the second device an indication of the check-in input based upon receipt of the check-in input;
   updating the stored status of the spot to occupied;
   subsequently receiving departure input, from the first device or the vehicle, indicating that the vehicle has departed the spot;
   outputting departure confirmation to the first device and the second device based upon the received departure input;
   updating the stored status of the spot to unoccupied; and
   outputting feedback interfaces to both the first device and the second device.

2. The computer-implemented method of claim 1, further comprising:
   receiving vehicle selection input from the parker at the first device to select from among a plurality of registered vehicles; and
   outputting to the first device a modification of available spots based upon input received from the first device that switches a vehicle choice from among the plurality of registered vehicles.

3. The computer-implemented method of claim 1, further comprising:
   outputting to the first device a photo or computer-rendered image of the spot corresponding to the selected spot.

4. The computer-implemented method of claim 1, further comprising:
   outputting to the first device a recommended registered vehicle or a vehicle suitability rating based upon a comparison of spots available for each of a plurality of registered vehicles within a same geographic area.

5. The computer-implemented method of claim 1, further comprising:
   rating spots with respect to the parker at the first device based upon traffic conditions in routes to the rated spots.

6. The computer-implemented method of claim 1, further comprising:
   outputting an advertisement to the first device based upon spot location.

7. The computer-implemented method of claim 1, further comprising:
   outputting to the first device, based upon receipt of the spot criteria, spot indicators representing residential spots and commercial spots, wherein residential spots are denoted by a residential spot graphical representation that differs from a commercial spot graphical representation.

8. A system for parking management, comprising:
memory; and
a processor coupled to the memory, the processor being configured to:
   receive, from a parker at a first device, authentication input and then vehicle input that associates a vehicle with the parker, wherein the vehicle input comprises vehicle registration input or selection of a registered vehicle;
   subsequently receive, from the parker at the first device, spot criteria comprising location criteria and temporal criteria;
   output to the first device, based upon receipt of the spot criteria, spot indicators representing spots based on the location criteria, the temporal criteria, and characteristics of the vehicle, wherein each spot comprises a stored status;
   subsequently receive a selection of the spot from the parker at the first device;
   output to the first device, based upon receipt of the selected spot, a graphical representation of the spot corresponding to the spot selected;
   subsequently receive acceptance confirmation input at a second device from an owner of the spot;
   output, based upon receipt of both the selection of the spot from the first device and confirmation input from the second device, rental confirmation to both the first device and the second device;
   update the stored status of the spot to reserved;
   receive, based upon outputting of the rental confirmation, check-in input from the first device or the vehicle;
   output to the second device an indication of the check-in input based upon receipt of the check-in input;
   update the stored status of the spot to occupied;

subsequently receive departure input, from the first device or the vehicle, indicating that the vehicle has departed the spot;
output departure confirmation to the first device and the second device based upon the received departure input;
update the stored status of the spot to unoccupied; and
output feedback interfaces to both the first device and the second device.

9. The system of claim 8 wherein the processor is further configured to:
with respect to the first device:
output to the first device a spot rating and an owner rating; or
receive from the first device filtering criteria relating to the spot rating and the owner rating; and
with respect to the second device:
output to the second device a parker rating; or
receive from the second device filtering criteria relating to the parker rating.

10. The system of claim 8 wherein the processor is further configured to output to the first device amenity information pertaining to each spot indicator.

11. The system of claim 8 wherein the processor is further configured to:
receive an inclement weather forecast pertaining to each spot indicator based upon the temporal data received from the first device and a geographic location corresponding to each spot indicator; and
output to the first device recommendations for spot indicators whose probability of inclement weather is less than a threshold value or range and for spot indicators featuring covered parking where the probability of inclement weather exceeds the threshold value or range.

12. The system of claim 8 wherein the processor is further configured to output a notification to the first device when the spot corresponding to the spot indicator is scheduled to become available.

13. The system of claim 8 wherein the processor is further configured to indicate spots reachable by the parker within an event start time, as determined by travel times based upon traffic conditions for routes between first device and a location corresponding to the spot indicator.

14. The system of claim 8 wherein the processor is further configured to filter spot indicators based upon historic availability data.

15. A non-transitory computer readable medium embodying computer-executable instructions, that when executed by a processor, cause the processor to execute operations for parking management comprising:
receiving, from a parker at a first device, authentication input and then vehicle input that associates a vehicle with the parker, wherein the vehicle input comprises vehicle registration input or selection of a registered vehicle;
subsequently receiving, from the parker at the first device, spot criteria comprising location criteria and temporal criteria;
outputting to the first device, based upon receipt of the spot criteria, spot indicators representing spots based on the location criteria, the temporal criteria, and characteristics of the vehicle, wherein each spot comprises a stored status;
subsequently receiving a selection of the spot from the parker at the first device;
outputting to the first device, based upon receipt of the selected spot, a graphical representation of the spot corresponding to the spot selected;
subsequently receiving acceptance confirmation input at a second device from an owner of the spot;
outputting, based upon receipt of both the selection of the spot from the first device and confirmation input from the second device, rental confirmation to both the first device and the second device;
updating the stored status of the spot to reserved;
receiving, based upon outputting of the rental confirmation, check-in input from the first device or the vehicle;
outputting to the second device an indication of the check-in input based upon receipt of the check-in input;
updating the stored status of the spot to occupied;
subsequently receiving departure input, from the first device or the vehicle, indicating that the vehicle has departed the spot;
outputting departure confirmation to the first device and the second device based upon the received departure input;
updating the stored status of the spot to unoccupied; and
outputting feedback interfaces to both the first device and the second device.

16. The non-transitory computer readable medium of claim 15 further comprising instructions for:
receiving a notification threshold value, from the first device or the second device, corresponding to an amount of time prior to expiration of a spot rental; and
providing to the first device, based upon the notification threshold value, an option to extend the spot rental.

17. The non-transitory computer readable medium of claim 15 further comprising instructions for:
receiving a bid amount from the first device and outputting to the first device an indication of which spot indicators correspond to prices equal to or less than the bid amount; or
receiving a rental price from the second device and outputting to the second device an indication of which spot indicators correspond to bids equal to or exceeding the rental price.

18. The non-transitory computer readable medium of claim 15 further comprising instructions for:
receiving terms or conditions from the first device; and
outputting to the first device an indication of which spot indicators correspond to terms or conditions compatible with the terms or conditions received from the first device.

19. The non-transitory computer readable medium of claim 15 further comprising instructions for outputting authentication credentials to the first device and the second device for creating anonymized communication between the first device and the second device.

20. The non-transitory computer readable medium of claim 15 further comprising instructions for outputting to the first device spot indicators that are only visible to the parker belonging to a defined subset of all registered parkers.

* * * * *